United States Patent
Liu et al.

(10) Patent No.: US 11,053,383 B1
(45) Date of Patent: Jul. 6, 2021

(54) CELLULOSE/MELAMINE-FORMALDEHYDE COMPOSITE RESIN AND PREPARATION METHOD THEREOF

(71) Applicant: ANHUI OGT NEW MATERIAL CO., LTD., Anhui (CN)

(72) Inventors: Hailin Liu, Anhui (CN); Hewen Liu, Anhui (CN); Yangli Pan, Anhui (CN); Xiyang Yue, Anhui (CN); Zan Wang, Anhui (CN); Qingmeng Liu, Anhui (CN)

(73) Assignee: ANHUI OGT NEW MATERIAL CO., LTD., Anhui (CN)

( * ) Notice: Subject to any disclaimer, the term of this patent is extended or adjusted under 35 U.S.C. 154(b) by 457 days.

(21) Appl. No.: 16/307,149

(22) PCT Filed: Nov. 5, 2018

(86) PCT No.: PCT/CN2018/113930
§ 371 (c)(1),
(2) Date: Dec. 5, 2018

(87) PCT Pub. No.: WO2020/087550
PCT Pub. Date: May 7, 2020

(30) Foreign Application Priority Data

Oct. 31, 2018 (CN) .......................... 201811285171.8

(51) Int. Cl.
*C08L 61/28* (2006.01)
(52) U.S. Cl.
CPC ........... *C08L 61/28* (2013.01); *C08L 2205/06* (2013.01); *C08L 2205/16* (2013.01)
(58) Field of Classification Search
CPC ... C08L 61/28; C08L 2205/06; C08L 2205/16
See application file for complete search history.

(56) References Cited

U.S. PATENT DOCUMENTS

| 2,310,004 | A | * | 2/1943 | Widmer | D06M 15/423 |
| | | | | | 524/35 |
| 2,582,303 | A | * | 1/1952 | Wohnsiedler | C08L 33/00 |
| | | | | | 524/291 |
| 2,841,571 | A | * | 7/1958 | Wohnsiedler | C08L 61/28 |
| | | | | | 526/60 |
| 2007/0299218 | A1 | * | 12/2007 | Yeh | H05K 3/386 |
| | | | | | 525/524 |

FOREIGN PATENT DOCUMENTS

| CN | 101585953 | | 11/2009 | |
| CN | 105038120 | A * | 11/2015 | ......... G06F 16/9535 |
| CN | 106117968 | | 11/2016 | |

OTHER PUBLICATIONS

E.C. Leonard, "Polymerization-Dimer Acids," J. Am. Oil Chemists' Soc., Nov. 1979 (vol. 56) 782A.*
Thomas E. Breuer, "Dimer Acids," Kirk-Othmer Encyclopedia of Chemical Technology, 13 pages (2000).*
Boy Cornils & Peter Lappe, "Dicarboxylic Acids, Aliphatic," Ullmann's Encyclopedia of Industrial Chemistry, 18 pages (2014).*
English-language machine translation of CN10538120A on Espacenet website on May 3, 2021, 12 pages.*

* cited by examiner

*Primary Examiner* — Nicholas E Hill
(74) *Attorney, Agent, or Firm* — JCIPRNET

(57) ABSTRACT

A cellulose/melamine-formaldehyde composite resin, the raw materials of the cellulose/melamine-formaldehyde composite resin comprise by weight percentage: 30-90% of melamine-formaldehyde resin, 5-60% of cellulose powder, 0.01-0.1% of curing agent, 0-20% of inorganic filler, 1-5% of surface modifier, 1-20% of dimer acid. A preparation method of the said cellulose/melamine-formaldehyde composite resin is also provided. The preparation method comprises the following steps: stirring the raw materials, then sieving and molding.

8 Claims, No Drawings

CELLULOSE/MELAMINE-FORMALDEHYDE COMPOSITE RESIN AND PREPARATION METHOD THEREOF

CROSS-REFERENCE TO RELATED APPLICATION

This application is a 371 application of an international PCT application serial no. PCT/CN2018/113930, filed on Nov. 5, 2018, which claims priority to and the benefit of China Patent Application No. 201811285171.8, filed on Oct. 31, 2018. The entirety of each of the above-mentioned patent applications is hereby incorporated by reference herein and made a part of this specification.

BACKGROUND OF THE INVENTION

Technical Field

The present application relates to the field of polymer material, and in particular to cellulose/melamine-formaldehyde composite resin and preparation method thereof.

Description of Related Art

Melamine-formaldehyde resin, also known as melamine resin, is obtained by polycondensation reaction of melamine and formaldehyde in a suitable medium. The resin is widely used in the manufacture of imitated porcelain tableware, electrical appliances and other daily necessities. However, melamine-formaldehyde resin has the disadvantages of large brittleness, poor toughness, easily broken by stress etc. Cellulosic biomass powders are widely used in melamine-formaldehyde resins, such as plant stems, crop straw powder, cereal husk powder, and cereal flour. This melamine-formaldehyde resin/cellulose powder composite is made into a product by molding at a high temperature. The melamine-formaldehyde resin/cellulose powder molded product has poor strength and is more likely to be broken than melamine resin. In order to increase the strength, the product needs to be very thick and heavy.

Generally, a toughening modifier is added when a melamine-formaldehyde resin is synthesized during the preparation of a melamine resin. The Chinese patent which was made public on Nov. 25, 2009 (Pub. No.: CN101585953A) discloses a preparation method of a melamine-formaldehyde molding compound, wherein the melamine and the modifier are simultaneously added to the kettle to obtain a melamine-formaldehyde molding compound. And the modifier is a mixture of any one or more of polyvinyl alcohol, polyethylene glycol, p-toluenesulfonamide, dicyandiamide and benzoguanamine, which improves the strength and toughness of the molding compound.

The Chinese patent which was made public on Nov. 16, 2016 (Pub. No. CN106117968A) discloses an amino molding compound powder for processing melamine tableware and a preparation method thereof. It is composed of melamine resin molding compound, wood fiber, sodium citrate, titanium dioxide and zinc stearate.

Because the melamine-formaldehyde resin produced by the prior art still has deficiency of large brittleness and easy falling off, and the biomass cellulose powder with poor composite strength and complex composition, the obtained melamine formaldehyde resin/cellulose powder molded product has poor strength, is easily broken when subjected to force or drop.

SUMMARY OF THE INVENTION

Based on the technical problems existing in the background art, the present application provides a cellulose/melamine-formaldehyde composite resin and a preparation method thereof, which not only have a good toughening effect, but also effectively improve the drawbacks wherein it is poor in strength and fragile when stressed or dropped, and the preparation process is simple and low-cost.

The present application provides a cellulose/melamine-formaldehyde composite resin, the raw materials of the cellulose/melamine-formaldehyde composite resin comprise by weight percentage: 30-90% of melamine-formaldehyde resin, 5-60% of cellulose powder, 0.01-0.1% of curing agent, 0-20% of inorganic filler, 1-5% of surface modifier, and 1-20% of dimer acid.

Preferably, the surface modifier is at least one of zinc stearate, calcium stearate and silane coupling agent.

The surface modifier added in the present application, especially zinc stearate, calcium stearate and silane coupling agents, can improve the compatibility of the particles, and also avoid the aggregation between different particles due to their different surface charges.

Preferably, the cellulose powder is at least one of plant stalk powder, grain flour and cereal husk powder.

The present application uses natural regenerated plant fibers of plant stalk powder, grain flour, cereal husk powder, etc, as raw materials for production, which are purified natural, non-polluting, and non-toxic. Plant stalk powder, grain flour, and cereal husk powder are discarded crops, the treatment of which is very problematic in the past, for example, the long-term stacking of them causes the surrounding environment to be dirty and messy, incineration of them causes serious pollution of the air, generating a lot of carbon dioxide, sulfur dioxide, which also bury hidden dangers of fire, or even destroy the soil structure.

Plant stalk powder, grain flour, and cereal husk powder are regenerated biopolymer materials with huge yield on the earth. The use of them, in addition to being safer and environmentally friendly, is harmless to the human body, which can replace traditional materials such as plastics, melamine, etc. Compared with traditional materials, the natural regenerated plant fiber is used as raw material for production, which pays more attention to health and environmental protection, and has no potential impact and harm to human body. It is such an environmentally-friendly and efficient production method, that it not only achieves farmers' re-income, bringing objective practical benefits to farmers, but also protects the environment of the atmosphere and soil. More importantly, it avoids the problems of felling trees and chemical pollution generated in the production of traditional materials. It can be degraded in the natural environment after disposal, which reduces the environmental pollution during the treatment of agricultural waste. Its degradability further eliminates white pollution.

Preferably, the inorganic filler is at least one of alumina, calcium carbonate, silica, and montmorillonite.

The alumina, calcium carbonate, silica, and montmorillonite added in the present application as an inorganic filler, which can decline the weakening strength of the product caused by the addition of the cellulose powder in a large amount, and can improve the strength of the product.

The preparation method of the above-mentioned cellulose/melamine-formaldehyde composite resin proposed in the present application, the preparation method comprising the following steps: stirring the raw materials, then sieving and molding.

The raw materials are all solid powder.

Preferably, the stirring time is 10-30 min, the temperature during stirring is 40-60° C.

Preferably, a screen used for sieving has a mesh of 80.

Preferably, the molding temperature is 140-180° C., the molding pressure is 500-2000 kN, and the molding time is 2-10 min.

The present application uses the dimer acid as a toughening agent, the dimer acid can react with the melamine-formaldehyde resin to introduce a flexible chain structure, which has obvious toughening effect and can significantly improve the brittleness of the melamine-formaldehyde resin product, and wherein the dimer acid is a traditional chemical product with low price. Comparing with the known melamine-formaldehyde resin, the toughening agent of the present application is added during the stirring, and the process is simple.

DESCRIPTION OF THE EMBODIMENTS

The technical solutions of the present application are illustrated in detail below through specific embodiments.

Example 1

A cellulose/melamine-formaldehyde composite resin, the raw materials of which comprise: 88.9 kg of melamine-formaldehyde resin, 5 kg of cellulose powder, 0.1 kg of curing agent, 5 kg of surface modifier, and 1 kg of dimer acid.

Example 2

A cellulose/melamine-formaldehyde composite resin, the raw materials of which comprise: 30.99 kg of melamine-formaldehyde resin, 8 kg of cellulose powder, 0.01 kg of curing agent, 10 kg of inorganic filler, 1 kg of surface modifier, and 10 kg of dimer acid.

Example 3

A cellulose/melamine-formaldehyde composite resin, the raw materials of which comprise: 30 kg of melamine-formaldehyde resin, 28.98 kg of plant stalk, 0.02 kg of curing agent, 20 kg of montmorillonite, 1 kg of zinc stearate, and 20 kg of dimer acid.

Example 4

A cellulose/melamine-formaldehyde composite resin, the raw materials of which comprise: 45 kg of melamine-formaldehyde resin, 32.94 kg of cellulose powder, 0.06 kg of curing agent, 12 kg of inorganic filler, 5 kg of surface modifier, and 5 kg of dimer acid, wherein the cellulose powder are grain flour and cereal husk powder, the inorganic filler are alumina and montmorillonite, the surface modifier are zinc stearate and silane coupling agent.

A method for preparing the cellulose/melamine-formaldehyde composite resin comprises the following steps: stirring the raw materials for 10 min under the condition that the temperature during stirring is 60° C., then sieving with an 80-mesh screen and molding at 140° C. for 10 min, wherein the molding pressure is 500 kN.

Example 5

A cellulose/melamine-formaldehyde composite resin, the raw materials of which comprise: 35.97 kg of melamine-formaldehyde resin, 60 kg of cellulose powder, 0.03 kg of curing agent, 1 kg of inorganic filler, 1 kg of surface modifier, 2 kg of dimer acid, wherein the cellulose powder are plant stalk powder, grain flour and cereal husk powder, the inorganic filler are alumina, calcium carbonate, silica, and montmorillonite, the surface modifier are zinc stearate, calcium stearate and silane coupling agent.

A method for preparing the cellulose/melamine-formaldehyde composite resin comprises the following steps: stirring the raw materials for 30 min under the condition that the temperature during stirring is 40° C., then sieving with an 80-mesh screen and molding at 180° C. for 2 min, wherein the molding pressure is 1980 kN.

Example 6

A cellulose/melamine-formaldehyde composite resin, the raw materials of which comprise: 40 kg of melamine-formaldehyde resin, 50 kg of rice husk powder, 0.1 kg of curing agent, 5 kg of alumina, 2 kg of zinc stearate, 3 kg of dimer acid.

A method for preparing the cellulose/melamine-formaldehyde composite resin comprises the following steps: stirring the raw materials for 10 min under the condition that the temperature during stirring is 60° C., then sieving with an 80-mesh screen and molding at 150° C. for 5 min, wherein the molding pressure is 2000 kN.

Comparative Example 1

A cellulose/melamine-formaldehyde composite resin, the raw materials of which comprise: 40 kg of melamine-formaldehyde resin, 50 kg of rice husk powder, 0.1 kg of curing agent, 5 kg of alumina, 2 kg of zinc stearate.

A method for preparing the cellulose/melamine-formaldehyde composite resin comprises the following steps: stirring the raw materials for 10 min under the condition that the temperature during stirring is 60° C., then sieving with an 80-mesh screen and molding at 150° C. for 5 min, wherein the molding pressure is 2000 kN.

Example 7

A cellulose/melamine-formaldehyde composite resin, the raw materials of which comprise: 40 kg of melamine-formaldehyde resin, 40 kg of bamboo fiber powder, 0.1 kg of curing agent, 5 kg of calcium stearate, 15 kg of dimer acid.

A method for preparing the cellulose/melamine-formaldehyde composite resin comprises the following steps: stirring the raw materials for 20 min under the condition that the temperature during stirring is 50° C., then sieving with an 80-mesh screen and molding at 150° C. for 5 min, wherein the molding pressure is 2000 kN.

Comparative Example 2

A cellulose/melamine-formaldehyde composite resin, the raw materials of which comprise: 40 kg of melamine-formaldehyde resin, 40 kg of bamboo fiber powder, 0.1 kg of curing agent, 5 kg of calcium stearate.

A method for preparing the cellulose/melamine-formaldehyde composite resin comprises the following steps: stirring the raw materials for 20 min under the condition that the temperature during stirring is 50° C., then sieving with an 80-mesh screen and molding at 150° C. for 5 min, wherein the molding pressure is 2000 kN.

Example 8

A cellulose/melamine-formaldehyde composite resin, the raw materials of which comprises: 30 kg of melamine-formaldehyde resin, 50 kg of rice straw powder, 0.1 kg of curing agent, 10 kg of silica powder with size of 300 mesh, 2 kg of silane coupling agent KH-550, 3 kg of calcium stearate, 5 kg of dimer acid.

A method for preparing the cellulose/melamine-formaldehyde composite resin comprises the following steps: stirring the raw materials for 20 min under the condition that the temperature during stirring is 50° C., then sieving with an 80-mesh screen and molding at 160° C. for 2 min, wherein the molding pressure is 2000 kN.

Comparative Example 3

A cellulose/melamine-formaldehyde composite resin, the raw materials of which comprise: 30 kg of melamine-formaldehyde resin, 50 kg of rice stalk powder, 0.1 kg of curing agent, 10 kg of silica powder with size of 300 mesh, 2 kg of silane coupling agent KH-550, 3 kg of calcium stearate.

A method for preparing the cellulose/melamine-formaldehyde composite resin comprises the following steps: stirring the raw materials for 20 min under the condition that the temperature during stirring is 50° C., then sieving with an 80-mesh screen and molding at 160° C. for 2 min, wherein the molding pressure is 2000 kN.

Example 9

A cellulose/melamine-formaldehyde composite resin, the raw materials of which comprise: 40 kg of melamine-formaldehyde resin, 50 kg of corn starch, 0.1 kg of curing agent, 5 kg of calcium stearate, 5 kg of dimer acid.

A method for preparing the cellulose/melamine-formaldehyde composite resin comprises the following steps: stirring the raw materials for 20 min under the condition that the temperature during stirring is 50° C., then sieving with an 80-mesh screen and molding at 160° C. for 2 min, wherein the molding pressure is 2000 kN.

Comparative Example 4

A cellulose/melamine-formaldehyde composite resin, the raw materials of which comprise: 40 kg of melamine-formaldehyde resin, 40 kg of corn starch, 0.1 kg of curing agent, 5 kg of calcium stearate.

A method for preparing the cellulose/melamine-formaldehyde composite resin comprises the following steps: stirring the raw materials for 20 min under the condition that the temperature during stirring is 50° C., then sieving with an 80-mesh screen and molding at 160° C. for 2 min, wherein the molding pressure is 2000 kN.

The cellulose/melamine-formaldehyde composite resin obtained in the examples 6-9 and the cellulose/melamine-formaldehyde composite resin obtained in the comparative examples 1-4 are respectively prepared into samples having a size of 5 cm×20 cm×0.5 cm, the samples are then subjected to a drop test as follows: place the sample parallel to the ground at a height of 2 meters, then let it fall freely, each sample is tested in parallel 50 times, count the damage (crack or break) occurred after the fall, the result is as follows:

| Test items | Test results |
| --- | --- |
| Example 6 | 1% |
| Comparative example 1 | 35% |
| Example 7 | 2% |
| Comparative example 2 | 38% |
| Example 8 | 4% |
| Comparative example 3 | 46% |
| Example 9 | 1% |
| Comparative example 4 | 32% |

It can be seen from the above table that the present application adopts the reaction of dimer acid and melamine-formaldehyde resin to introduce a flexible chain structure, and the toughening effect is obvious, and the brittleness of the melamine-formaldehyde resin product can be remarkably improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A cellulose/melamine-formaldehyde composite resin, the raw materials of the cellulose/melamine-formaldehyde composite resin comprise by weight percentage: 30-90% of a melamine-formaldehyde resin, 5-60% of a cellulose powder, 0.01-0.1% of a curing agent, 0-20% of an inorganic filler, 1-5% of a surface modifier, and 1-20% of a dimer acid.

2. The cellulose/melamine-formaldehyde composite resin according to claim 1, wherein the cellulose powder is at least one of plant stalk powder, grain flour and cereal husk powder.

3. The cellulose/melamine-formaldehyde composite resin according to claim 1, wherein the inorganic filler is at least one of alumina, calcium carbonate, silica, and montmorillonite.

4. The cellulose/melamine-formaldehyde composite resin according to claim 1, wherein the surface modifier is at least one of zinc stearate, calcium stearate and silane coupling agent.

5. A preparation method of the cellulose/melamine-formaldehyde composite resin according to claim 1, the preparation method comprising the following steps: stirring the raw materials, then sieving and molding.

6. The preparation method of the cellulose/melamine-formaldehyde composite resin according to claim 5, wherein the stirring time is 10-30 min, and the temperature during the stirring is 40-60° C.

7. The preparation method of the cellulose/melamine-formaldehyde composite resin according to claim 5, wherein a screen used for sieving has a mesh of 80.

8. The preparation method of the cellulose/melamine-formaldehyde composite resin according to claim 5, wherein the molding temperature is 140-180° C., the molding pressure is 500-2000 kN, and the molding time is 2-10 min.

* * * * *